US010275314B2

(12) United States Patent
Bolt et al.

(10) Patent No.: US 10,275,314 B2
(45) Date of Patent: Apr. 30, 2019

(54) DATA TRANSFER USING BACKUP POWER SUPPLY

(71) Applicant: HEWLETT PACKARD ENTERPRISE DEVELOPMENT LP, Houston, TX (US)

(72) Inventors: Matthew T Bolt, Houston, TX (US); David F. Heinrich, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/523,442

(22) PCT Filed: Nov. 20, 2014

(86) PCT No.: PCT/US2014/066502
§ 371 (c)(1),
(2) Date: May 1, 2017

(87) PCT Pub. No.: WO2016/080990
PCT Pub. Date: May 26, 2016

(65) Prior Publication Data
US 2017/0308442 A1    Oct. 26, 2017

(51) Int. Cl.
*G06F 12/00* (2006.01)
*G06F 11/14* (2006.01)
*H04L 12/10* (2006.01)

(52) U.S. Cl.
CPC ...... *G06F 11/1441* (2013.01); *G06F 11/1448* (2013.01); *G06F 11/1456* (2013.01); *H04L 12/10* (2013.01)

(58) Field of Classification Search
CPC combination set(s) only.
See application file for complete search history.

(56) References Cited

U.S. PATENT DOCUMENTS

| 5,117,324 | A  | 5/1992  | Johnson, Jr.    |
| 5,438,549 | A  | 8/1995  | Levy            |
| 5,717,934 | A  | 2/1998  | Pitt et al.     |
| 6,204,574 | B1 | 3/2001  | Chi             |
| 8,605,536 | B2 | 12/2013 | Terzioglu et al.|
| 2006/0080515 | A1 | 4/2006 | Spiers et al. |
| 2014/0156919 | A1 | 6/2014 | Chen et al.   |
| 2014/0310451 | A1 | 10/2014 | Lee et al.   |

FOREIGN PATENT DOCUMENTS

| CN | 101482840 A | 7/2009 |
| CN | 103544080 A | 1/2014 |

OTHER PUBLICATIONS

International Search Report & Written Opinion received in PCT Application No. PCT/US2014/066502, Aug. 13, 2015, 12 pages.

*Primary Examiner* — Yong J Choe
(74) *Attorney, Agent, or Firm* — Hewlett Packard Enterprise Patent Department

(57) ABSTRACT

Example implementations relate to data transfer using backup power supply. For example, a system includes a shared backup power supply coupled to a node. The system also includes a controller to detect an interruption of primary power supply to the node and isolate a portion of the node from a sequenced shutdown of the node. The controller is further to initiate a transfer of data, utilizing the shared backup power supply, from volatile memory of the node to non-volatile memory of the node.

12 Claims, 3 Drawing Sheets

DATA TRANSFER USING BACKUP POWER SUPPLY

BACKGROUND

As reliance on computing systems continues to grow, so too does the demand for reliable power systems and back-up schemes for these computing systems. Servers, for example, may provide architectures for backing up data to flash or persistent memory as well as back-up power sources for powering this back-up of data after the loss of power. Backup power supplies may sometimes include energy components such as capacitors or batteries.

BRIEF DESCRIPTION OF THE DRAWINGS

Some examples of the present application are described with respect to the following figures.

DETAILED DESCRIPTION

Figure 1:
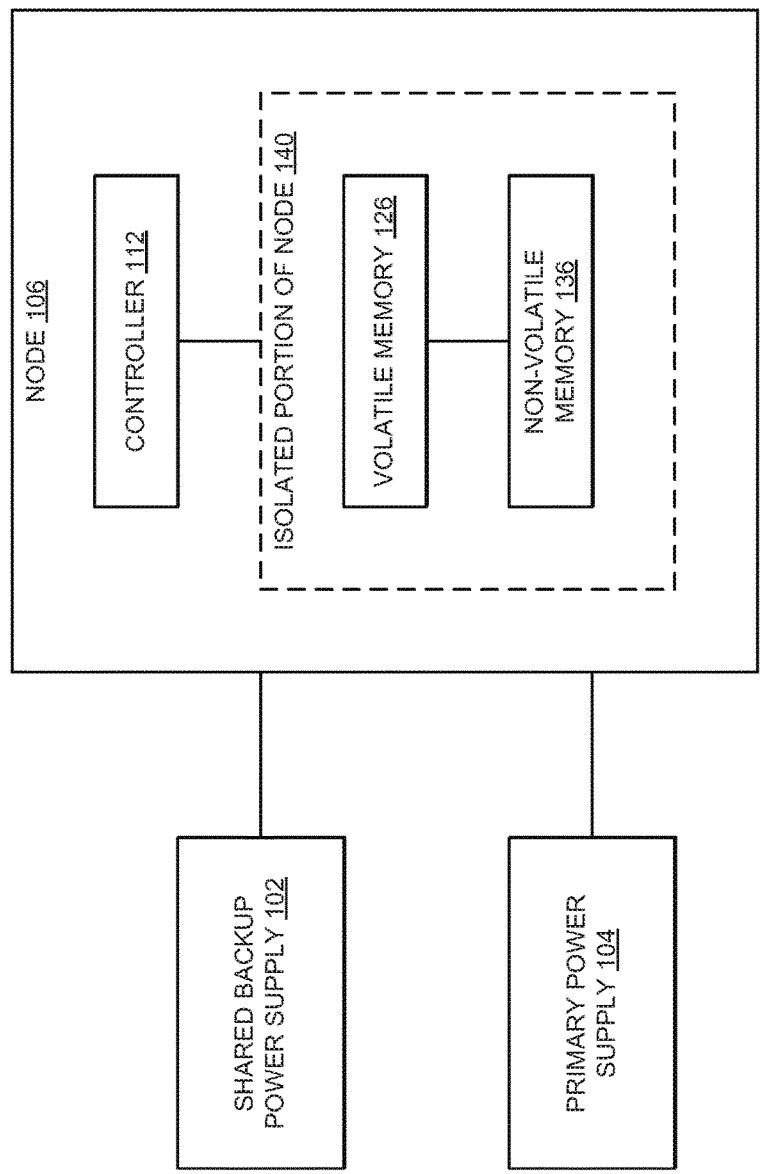
FIG. 1 illustrates an example of a system including a shared backup power supply to support data transfer during interruption of primary power supply.

A computing and/or data storage system can include a number of nodes. The nodes can be components of the computing and/or data storage system. For example, the nodes can include a server, a chassis of servers, a rack of servers, a group of servers, etc. A node can support a plurality of loads. For example, a load can include cache memory, dual in-line memory modules (DIMMs), non-volatile dual in-line memory modules (NVDIMMs), array control logic, volatile and/or non-volatile memory, among other storage controllers and/or devices associated with the servers. Volatile memory can include memory that depends upon power to store information (e.g., data), such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), among others.

An interruption of primary power supply can be scheduled or un-scheduled. For instance, a scheduled removal of the primary power supply can be the result of scheduled maintenance on the number of nodes and/or the number of loads. An un-scheduled primary power supply interruption can be an unintentional loss of primary power supply. An un-scheduled primary power supply interruption cart occur when, for example, the primary power supply fails momentarily and/or for an extended period of time. Failure can include unintentional toss of power to nodes and/or loads from the primary power supply.

It may be desirable to move data from volatile or cache memory in the number of nodes to non-volatile memory upon interruption of a primary power supply. However, moving data from volatile memory to non-volatile memory can involve a power supply. A backup power supply can be a secondary power supply that is used to provide power for moving data from volatile memory to non-volatile memory when the primary power is removed. Further, during this data transfer from volatile memory to non-volatile memory, it is important that data integrity is protected and data corruption is prevented.

Examples disclosed herein address the above needs and challenges by isolating a portion of a node (e.g., a server node) from reset and power down logic triggered due to removal of primary power supply from the node. The isolated portion of the node includes memory (i.e., volatile and non-volatile), CPU, and memory controller. In some examples, the reset and power down logic can be delayed. When the memory subsystem is isolated (or delayed) front the reset and power down process, the backup power supply can be activated to supply power to enable transfer of data from the volatile memory to the non-volatile memory of the node, to prevent data corruption.

In one example, a system includes a shared backup power supply coupled to a node. The system also includes a controller to detect, an interruption of primary power supply to the node and isolate a portion of the node from a sequenced shutdown of the node. The controller is further to initiate a transfer of data, utilizing the shared backup power supply, from volatile memory of the node to non-volatile memory of the node.

In another example, a method includes detecting, using a controller, an interruption of primary power supply to a server node and isolating a portion of the server node prior to initiating a sequenced shutdown of the server node. The method also includes initiating a transfer of data, utilizing a shared backup power supply, from a volatile memory location of the server node to a non-volatile memory location of the server node.

In another example, a non-transitory machine-readable storage medium is encoded with instructions executable by a processor to detect a failure of a primary power supply of a server node and isolate a portion of the server node from reset and power down processes of the server node, in response to the failure of the primary power supply. The instructions are executable by the processor to initiate a transfer of data, using a shared backup power supply, from a volatile memory location of the server node to a non-volatile memory location of the server node. The isolated portion of the server node includes the volatile memory location and the non-volatile memory location.

Referring now to the figures, FIG. 1 illustrates an example of a system including a shared backup power supply to support data transfer during interruption of primary power supply. System 100 can include a node 106 (e.g., a server node), a shared backup power supply 102, and a primary power supply 104. Primary power supply 104 can include an alternating current (AC) power supply such as voltage from a wall outlet (mains supply) and lowers it to a desired voltage. Shared backup power supply 102 can include an energy component to convert stored energy to electrical energy to deliver power to the loads of the node 106. Examples of the shared backup power supply 102 can include, but are not limited to, a rechargeable battery, a capacitor (e.g., supercapacitor, ultracapacitor, etc.), a flywheel, and the like.

While FIG. 1 illustrates the shared backup power supply 102 as a separate component from the node 106, examples are not so limited. For example, shared backup power supply 102 refers to power supply that is an integrated component of the node 106 and is used to provide power for transferring data from volatile memory 126 to non-volatile memory 136 when the primary power supply 104 is interrupted.

Providing backup power for moving data from volatile memory 126 to non-volatile memory 136 may include providing the node 106 with a shared backup power supply, rather than providing a backup power supply for each load within the node 106. That is, node 106 containing a number of loads can be connected to a shared backup power supply instead of, for example, providing a dedicated backup power supply for each load within the node 106 and therefore a single node could contain a plurality of backup power supplies.

Accordingly, shared backup power supply 102 can provide temporary source of power, for a threshold of time, to a plurality of loads associated with the node 106 when the primary power supply 104 is interrupted (e.g., fails). Shared backup power supply 102 can reside in a slot of the node 106 (e.g., be physically and/or directly plugged into a slot of the node 106). Accordingly, the shared backup power supply 102 can protect hardware and components of the system, such as a processing resource 108 (e.g., system central processing unit (CPU) and various systems (e.g., dual in-line memory modules, etc.), from data loss in response to the primary power supply interruption.

Node 106, such as a server node, can include a controller 112 to enable a transition from primary power supply 104 to the shared backup power supply 102, and vice versa. As used herein, transition refers to the change of power supplied to the node 106, transitioning from the primary power supply 104 to power supplied from the shared backup power supply 102 to the node 106. Controller 112 can include hardware and/or software to perform the functionality described herein. In certain examples, the controller 112 includes switch logic such as an electronic component that can break an electric circuit, interrupting the current or diverting it. For example the switch can be a switch-mode power supply type of transformer. In other examples, the controller 112 can include a complex programmable logic device (CPLD) that can control power MOSFETs or dedicated voltage regulators. Controller 112 can perform a number of functionality including managing access to memory, transition between primary and backup power supplies, and manage other devices within the node 106. As described above, node 106 can host a number of loads/devices such as storage controllers and/or a number of storage devices such as DIMMs and/or NVDIMMs, network interface controllers (NIC), smart array controllers (SACS), video card, processing resources, and the like.

During operation, controller 112 can detect an interruption of primary power supply to the node 106 (e.g., primary power failure). In response to the primary power failure, the controller 112 can isolate a portion 140 of the node from a sequenced shutdown of the node 106. The isolated portion 140 can include volatile memory 126 and non-volatile memory 136. In some examples, the isolated portion 140 can also include a memory controller and the CPU. The sequenced shutdown of the node 106 includes activation of reset and power down processes of the server node 106. By isolating at least the volatile memory 126 and non-volatile memory 136 from the reset and power down processes of the server node 106, data transfer using the shared backup power supply 102 can be implemented, thereby mitigating data corruption. Upon isolation of the portion 140 from the reset and power down processes, the controller 112 can initiate the transfer of data from the volatile memory 126 to the non-volatile memory 136 using power supplied by the shared backup power supply 102.

In some examples, the controller 112 activates the reset and power down processes at a second portion of the node 106 while the isolated portion 140 is excluded from the reset and power down processes. That is, reset and power down processes are allowed to proceed at a second portion of the node 106. The second portion of the node 106 can include input/output devices such as a peripheral connect interconnect express (PCIe) and the like. Further, during primary power interruption, the controller 112 can instruct the CPU to flush out any data including data in data buffers, to mitigate data corruption. Upon completion of the data transfer from the volatile memory 126 to the non-volatile memory 136, the reset and power down processes can proceed and be completed at the isolated portion 140 of the server node 106.

In certain examples, the reset and power down processes are delayed at the isolated portion 140 of the node 106, thus allowing for longer sustained functionality of the isolated portion 140, utilizing the shared backup power supply 102, to initiate and execute the data transfer. When the primary power supply 104 restored, controller 112 can deactivate the shared backup power supply 102.

As described above, in some examples, the reset and power down processes (i.e., the sequenced shutdown) of the node 106 can be performed by a CPLD. In such examples, the CPU and memory (i.e., volatile memory 126 and non-volatile memory 136) power is isolated from the rest of the node 106. In addition to power isolation, the resets that affect the memory and CPU can be delayed and masked until completion of the data transfer from the volatile memory 126 to the non-volatile memory 136. Reset masking and power isolation can be controlled by the CPLD. Power isolation can be implemented by controlling power MOSFETs or additional dedicated voltage regulators controlled by the CPLD. Reset masking can be implemented within the CPLD logic using new counters and enabling logic.

Figure 2:
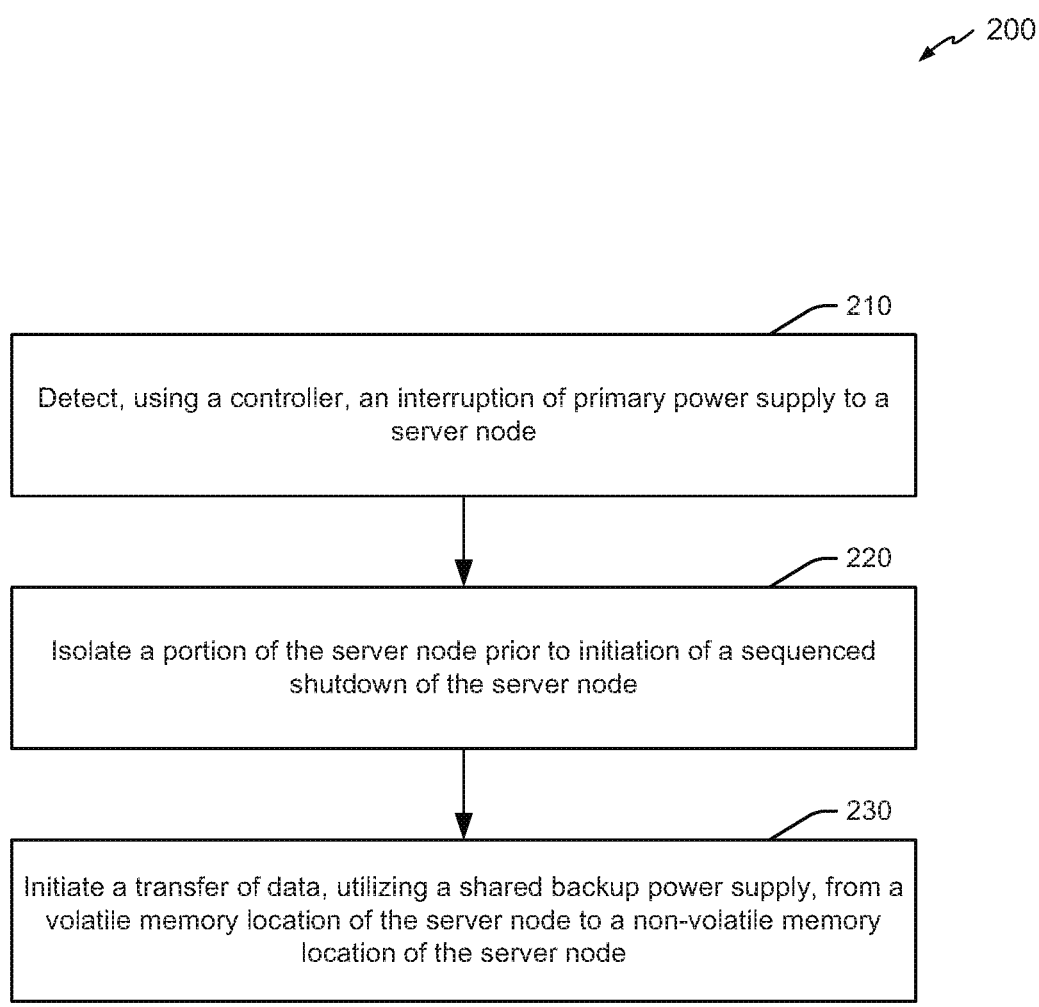
FIG. 2 is an example of a flowchart illustrating a method for transferring data, using a shared backup power supply, during interruption of primary power supply.

FIG. 2 is an example of a flowchart illustrating a method for transferring data, using a shared backup power supply, during interruption of primary power supply. Method 200 can be implemented, for example, in the form of executable instructions stored on a non-transitory machine-readable storage medium and/or in the form of electronic circuitry.

Method 200 includes detecting, using a controller, an interruption of primary power supply to a server node, at 210. For example, controller 112 can detect an interruption, such as a failure, of power from the primary power supply 104 to the server node (e.g., node 106). Controller 112 can include at least one of a switch and a CPLD to enable transition from the primary power supply 104 to the shared backup power supply 102, and vice versa, to supply power to the server node 106. Controller 112 can perform other functions such as managing and controlling a plurality of devices of the server node 106.

Method 200 includes isolating a portion of the server node prior to initiation of a sequenced shutdown of the server node, at 220. For example, controller 112 can isolate portion 140 of the server node 106 from a sequenced shutdown, where the sequenced shutdown can include reset and power down processes. The isolated portion 140 can include memory (i.e., volatile memory 126 and non-volatile memory 136), CPU and memory controller. In some examples, the reset and power down processes can be delayed for a time period. In certain examples, the reset and power down processes are activated in a second portion of the server node 106 that includes I/O devices notwithstanding the isolation of the portion 140. In some examples, isolating the portion 140 of the server node 140 includes reset masking and power isolation controllable by a CPLD. In this example, power isolation can occur by controlling MOSFETs or dedicated voltage regulators and reset masking can be executed within the CPLD logic using counters and enabling logic.

Method 200 also includes initiating a transfer of data, utilizing a shared backup power supply, from a volatile memory location of the server node to a non-volatile memory location of the server node, at 230. For example, once the portion 140 is isolated from the reset and power down processes, the controller 112 can activate or instruct the shared backup power supply 102 to provide backup power to the portion 140 to execute transfer of data from the volatile memory 126 to the non-volatile memory 136. Upon completion of the data transfer, the sequenced shutdown can be allowed to proceed at the isolated portion 140. In some examples, the method 200 of FIG. 2 includes additional steps in addition to and/or in lieu of those depicted in FIG. 2.

Figure 3:
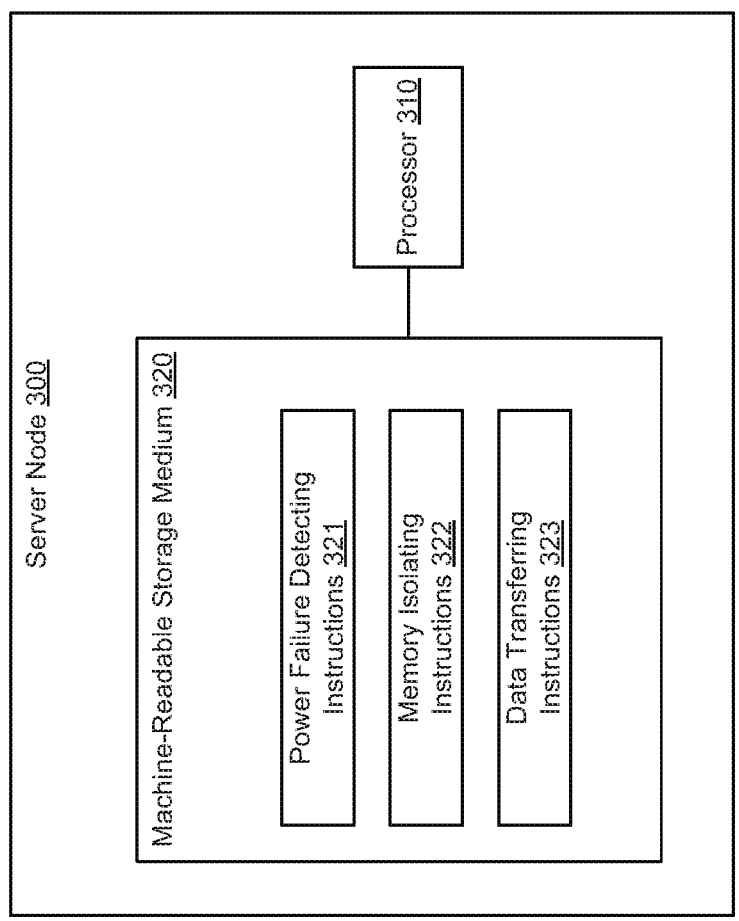
FIG. 3 illustrates an example of a server node including a computer readable medium having instructions to transfer data using a shared backup power supply during interruption of primary power supply.

FIG. 3 illustrates an example of a server node including a computer-readable medium having instructions to transfer data using a shared backup power supply during interruption of primary power supply. Server node 300 includes machine-readable storage medium 320. Machine-readable storage medium 320 includes instructions 321, 322, and 323 executable by a processor 310 to perform the functionalities described herein.

Power failure detecting instructions 321 include instructions to detect a failure of a primary power supply of a server node. For example, the instructions can be executable to detect or determine when a primary power supply of the server node 300 fails. For example, the failure can be detected based on a drop, below a certain threshold, in a voltage and/or current from the primary power supply to the server node 300.

Memory isolating instructions 322 include instructions to isolate a portion of the server node from reset and power down processes of the server node, in response to the failure. For example, the instructions can be executable to isolate a portion of the server node 300 including the memory (volatile and non-volatile), CPU, and memory controller from the reset and power down processes, in order to preserve data integrity.

Data transferring instructions 323 include instructions to initiate a transfer of data, using a shared backup power supply, from a volatile memory location of the server node to a non-volatile memory location of the server node. For example, the instructions can be executable to initiate the transfer of data from volatile memory to non-volatile memory of the server node 300, by activating the shared backup power supply, The techniques described above may be embodied in a computer-readable medium for configuring a computing system to execute the method. The computer-readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and obvious types of computer-readable media may be used to store the software modules discussed herein. Computing systems may be found in many forms including but not limited to mainframes, minicomputers, servers, workstations, personal computers, notepads, personal digital assistants, tablets, smartphones, various wireless devices and embedded systems, just to name a few.

In the foregoing description, numerous details are set forth to provide an understanding of the present disclosure. However, it will be understood by those skilled in the art that the present disclosure may be practiced without these details. While the present disclosure has been disclosed with respect to a limited number of examples, those skilled in the art will appreciate numerous modifications and variations therefrom. It is intended that the appended claims cover such modifications and variations as fall within the true spirit and scope of the present disclosure.

What is claimed is:

1. A system, comprising:
    a shared backup power supply coupled to a node;
    a controller to:
        detect an interruption of primary power supply to the node;
        isolate a portion of the node from a sequenced shutdown of the node, the sequenced shutdown including activation of reset and power down processes;
        activate the reset and power down processes at a different portion of the node while the isolated portion is excluded from the reset and power down processes;
        initiate a transfer of data, utilizing the shared backup power supply, from volatile memory of the node to non-volatile memory of the node; and
        activate the reset and power down processes at the isolated portion of the node upon completion of the data transfer.

2. The system of claim 1, the controller to activate the reset and power down processes at a second portion of the node while the isolated portion is excluded from the reset and power down processes, wherein the second portion includes input/output (I/O) devices of the node.

3. The system of claim 1, wherein the controller includes at least one of a switch module and a complex programmable logic device (CPLD) module to enable a transition between the primary power supply and the shared backup power supply.

4. The system of claim 3, the controller to:
    activate the shared backup power supply to provide backup power to transfer the data from the volatile memory to the non-volatile memory; and
    deactivate the shared backup power supply in response to a restoration of the primary power supply.

5. The system of claim 1, wherein the isolated portion of the node includes a memory controller, the volatile memory, the non-volatile memory, and a central processing unit (CPU).

6. The system of claim 1, wherein the shared backup power supply is integrated into the node to provide backup power supply to the node for a threshold of time.

7. A method comprising:
    detecting, using a controller, an interruption of primary power supply to a server node;
    isolating a portion of the server node prior to initiating a sequenced shutdown of the server node including activation of reset and power down processes;
    activating the reset and power down processes at a different portion of the node while the isolated portion is excluded from the reset and power down processes;
    initiating a transfer of data, utilizing a shared backup power supply, from a volatile memory location of the server node to a non-volatile memory location of the server node; and activating the reset and power down processes at the isolated portion of the node upon completion of the data transfer.

8. The method of claim 7, wherein the isolated portion of the server node includes the volatile memory location, the non-volatile memory location, a memory controller, and a central processing unit (CPU) of the server node.

9. The method of claim 7, comprising activating the sequenced shutdown at a second portion of the server node while isolating the portion of the server node, wherein the second portion of the server node includes input/output (I/O) devices.

10. The method of claim 7, wherein isolating the portion of the server node includes delaying activation of reset and power down processes at the portion of the server node.

11. A non-transitory machine-readable storage medium encoded with instructions executable by a processor, the machine-readable storage medium comprising instructions to:

detect a failure of a primary power supply of a server node;

isolate a portion of the server node from reset and power down processes of the server node, in response to the failure of the primary power supply, the sequenced shutdown including activation of reset and power down processes;

activate the reset and power down processes at a different portion of the server node while the isolated portion is excluded from the reset and power down processes;

initiate a transfer of data, utilizing the shared backup power supply, from a volatile memory location of the server node to a non-volatile memory location of the server node; and activate the reset and power down processes at the isolated portion of the node upon completion of the data transfer, wherein the isolated portion includes the volatile memory location and the non-volatile memory location.

12. The non-transitory machine-readable storage medium of claim 11, comprising instructions to delay the reset and power down processes at the isolated portion until completion of the data transfer.

* * * * *